(12) United States Patent
Kenny et al.

(10) Patent No.: US 8,499,337 B1
(45) Date of Patent: Jul. 30, 2013

(54) SYSTEMS AND METHODS FOR DELEGATION AND NOTIFICATION OF ADMINISTRATION OF INTERNET ACCESS

(75) Inventors: Shane Kenny, Acworth, GA (US); Aaron Kenny, Dallas, GA (US)

(73) Assignee: McAfee, Inc., Santa Clara, CA (US)

( * ) Notice: Subject to any disclaimer, the term of this patent is extended or adjusted under 35 U.S.C. 154(b) by 1238 days.

(21) Appl. No.: 11/244,542

(22) Filed: Oct. 6, 2005

Related U.S. Application Data

(60) Provisional application No. 60/616,490, filed on Oct. 6, 2004, provisional application No. 60/646,234, filed on Jan. 24, 2005.

(51) Int. Cl.
*G06F 21/00* (2006.01)

(52) U.S. Cl.
USPC ............................ 726/4; 726/1; 726/3

(58) Field of Classification Search
None
See application file for complete search history.

(56) References Cited

U.S. PATENT DOCUMENTS

| | | | |
|---|---|---|---|
| 5,237,677 A | 8/1993 | Hirosawa et al. | |
| 5,490,216 A | 2/1996 | Richardson, III | |
| 5,557,742 A * | 9/1996 | Smaha et al. | 726/22 |
| 5,583,940 A | 12/1996 | Vidrascu et al. | |
| 5,696,486 A | 12/1997 | Poliquin et al. | |
| 5,732,212 A | 3/1998 | Perholtz et al. | |
| 5,832,212 A | 11/1998 | Cragun et al. | |
| 5,835,722 A | 11/1998 | Bradshaw et al. | |
| 5,889,958 A | 3/1999 | Willens | |
| 5,941,996 A * | 8/1999 | Smith et al. | 714/47 |
| 5,944,782 A | 8/1999 | Noble et al. | |
| 5,958,010 A * | 9/1999 | Agarwal et al. | 709/224 |
| 5,987,610 A | 11/1999 | Franczek et al. | |
| 5,987,611 A | 11/1999 | Freund | |

(Continued)

FOREIGN PATENT DOCUMENTS

| | | |
|---|---|---|
| DE | 19359052 | 9/1996 |
| EP | 0554182 | 8/1993 |

(Continued)

OTHER PUBLICATIONS

Spytech Software and Design, Inc. "Spytech NetVizor"_SpyTech Online_. Oct. 3, 2003. _Internet Archive_. <http://web.archive.org/web/20031003021346/http://www.spytech-web.com/>.*

(Continued)

*Primary Examiner* — Nathan Flynn
*Assistant Examiner* — Michael R Vaughan
(74) *Attorney, Agent, or Firm* — Patent Capital Group

(57) ABSTRACT

Disclosed are systems, methods, and computer readable media for delegating administrative rights to a third party in an Internet access control application comprising receiving a designation of a third party wherein the designation identifies the third party as a recipient of administrative rights in an access control application, and receiving a selection of administrative rights to be associated with the third party. Further, an invitation can be sent, or caused to be sent, to the third party. Acceptance of said invitation can be received. Also, administrative rights can be granted to the third party. The systems, methods, and computer readable media can be operable within a client/server architecture. Also disclosed are systems, methods, and computer readable media for notification of an access policy violation. Also disclosed are systems, methods, and computer readable media for administration of an access control application by a third party and access policy violation notification.

23 Claims, 9 Drawing Sheets

U.S. PATENT DOCUMENTS

| | | | | |
|---|---|---|---|---|
| 6,012,100 | A | 1/2000 | Frailong et al. | |
| 6,026,438 | A | 2/2000 | Piazza et al. | |
| 6,035,332 | A | 3/2000 | Ingrassia, Jr. et al. | |
| 6,052,730 | A | 4/2000 | Felciano et al. | |
| 6,073,142 | A | 6/2000 | Geiger et al. | |
| 6,185,613 | B1 | 2/2001 | Lawson et al. | |
| 6,219,804 | B1 | 4/2001 | Mastrangelo et al. | |
| 6,289,378 | B1 | 9/2001 | Meyer et al. | |
| 6,330,597 | B2 | 12/2001 | Collin et al. | |
| 6,397,256 | B1 | 5/2002 | Chan et al. | |
| 6,446,119 | B1 | 9/2002 | Olah et al. | |
| 6,460,050 | B1 | 10/2002 | Pace et al. | |
| 6,502,131 | B1 * | 12/2002 | Vaid et al. | 709/224 |
| 6,578,146 | B2 | 6/2003 | Johnson | |
| 6,606,659 | B1 * | 8/2003 | Hegli et al. | 709/225 |
| 6,615,255 | B1 | 9/2003 | Blaszczak | |
| 6,631,363 | B1 | 10/2003 | Brown et al. | |
| 6,651,190 | B1 | 11/2003 | Worley et al. | |
| 6,671,357 | B1 * | 12/2003 | Roberts, Jr. | 379/93.02 |
| 6,675,193 | B1 | 1/2004 | Slavin et al. | |
| 6,895,285 | B2 * | 5/2005 | Maity | 700/27 |
| 7,194,464 | B2 | 3/2007 | Kester et al. | |
| 7,363,656 | B2 * | 4/2008 | Weber et al. | 726/23 |
| 7,406,715 | B2 * | 7/2008 | Clapper | 726/25 |
| 7,506,155 | B1 | 3/2009 | Stewart et al. | |
| 7,890,642 | B2 * | 2/2011 | Jones et al. | 709/229 |
| 7,900,239 | B2 | 3/2011 | Van Someren | |
| 8,010,552 | B2 | 8/2011 | Kester et al. | |
| 2002/0049806 | A1 | 4/2002 | Gatz et al. | |
| 2002/0078203 | A1 | 6/2002 | Greschler et al. | |
| 2002/0087650 | A1 | 7/2002 | Fagerburg et al. | |
| 2002/0166069 | A1 | 11/2002 | Zendzian | |
| 2002/0174367 | A1 * | 11/2002 | Kimmel et al. | 713/201 |
| 2003/0033450 | A1 | 2/2003 | Appleby-Alis | |
| 2003/0110168 | A1 | 6/2003 | Kester et al. | |
| 2003/0123465 | A1 | 7/2003 | Donahue | |
| 2003/0135382 | A1 * | 7/2003 | Marejka et al. | 705/1 |
| 2003/0207237 | A1 * | 11/2003 | Glezerman | 434/118 |
| 2004/0003279 | A1 | 1/2004 | Beilinson et al. | |
| 2004/0158630 | A1 * | 8/2004 | Chang et al. | 709/224 |
| 2004/0186989 | A1 * | 9/2004 | Clapper | 713/151 |
| 2004/0230530 | A1 | 11/2004 | Searl et al. | |
| 2004/0267595 | A1 * | 12/2004 | Woodings et al. | 705/9 |
| 2005/0015624 | A1 * | 1/2005 | Ginter et al. | 713/201 |
| 2005/0050148 | A1 * | 3/2005 | Mohammadioun et al. | 709/206 |
| 2005/0060581 | A1 | 3/2005 | Chebolu et al. | |
| 2005/0080897 | A1 | 4/2005 | Braun et al. | |
| 2005/0102407 | A1 * | 5/2005 | Clapper | 709/228 |
| 2005/0102510 | A1 | 5/2005 | Patrick et al. | |
| 2005/0138423 | A1 | 6/2005 | Ranganathan | |
| 2005/0177871 | A1 * | 8/2005 | Roesch et al. | 726/13 |
| 2005/0183143 | A1 | 8/2005 | Anderholm et al. | |
| 2005/0289226 | A1 | 12/2005 | Mohammed et al. | |
| 2006/0218575 | A1 * | 9/2006 | Blair | 725/28 |
| 2007/0179950 | A1 | 8/2007 | Kester et al. | |
| 2007/0222589 | A1 * | 9/2007 | Gorman et al. | 340/539.26 |
| 2008/0155685 | A1 | 6/2008 | Beilinson et al. | |
| 2008/0201159 | A1 * | 8/2008 | Gabrick et al. | 705/1 |
| 2008/0250484 | A1 * | 10/2008 | Chong et al. | 726/7 |
| 2011/0307513 | A1 | 12/2011 | Kester et al. | |
| 2012/0089500 | A1 | 4/2012 | Dheer et al. | |

FOREIGN PATENT DOCUMENTS

| | | |
|---|---|---|
| EP | 1318468 | 6/2003 |
| JP | 5274177 | 10/1993 |
| JP | 7306800 | 11/1995 |
| JP | 2003-233623 | 8/2003 |

OTHER PUBLICATIONS

"enKoo Remote Access Appliance," Dreaming Tree Technology, Inc. http://www.ssltunnel.com/default.asp, 2 pages, printed from the Internet Jun. 14, 2005.

"GoToMyPC," https://www.gotomypc.com/tr/ggp/mb/aw/remote.access.computer-broad/g25ggllp?Target=mm/g25ggll.tmpl, 1 page, printed from the Internet Jun. 14, 2005.

"iPrism—Internet Access Management," 1$^{st}$—Computer-Networks.co.uk http://www.1st-computer-networks.co.uk/iprism/htm, 4 pages, printed from the Internet Jun. 9, 2005.

"My WebEx PC," http://www.webex.com/lp/aa.php?type=keyword, 1 page, printed from the Internet Jun. 14, 2005.

"NetVizor User Manual," WareSight.com http://www.waresight.com/nv_manual.shtml, 10 pages, printed from the Internet Jun. 9, 2005.

"Remote Computer Access Software," NetworkStreaming, http://www.networkstreaming.com/index.htm, 1 page, printed from the Internet Jun. 14, 2005.

"Remotely Access your PCs + servers from anywhere," Remotely Anywhere, http://www.remotelyanywhere.com/dmcq/remoteaccess.asp, 1 page, printed from the Internet Jun. 14, 2005.

"Server Monitoring," ServerMojo.com http://www.servermojo.com/, 2 pages, printed from the Internet Jun. 9, 2005.

"SurfControl WebFilter 5.0," ISAServer.org http://www.isaserver.org/articles/Review-SurfControl-Web-Filter-ISA-Server-2004.html, 4 pages, printed from the Internet Jun. 9, 2005.

Request for Continued Examination and Amendment filed in Response to Final Office Action dated May 5, 2011 in U.S. Appl. No. 12/464,504, filed Aug. 5, 2011.

USPTO Sep. 17, 2010 Nonfinal Office Action from U.S. Appl. No. 12/464,504.

USPTO Feb. 16, 2011 Response to Sep. 17, 2010 Nonfinal Office Action from U.S. Appl. No. 12/464,504.

USPTO May 5, 2011 Final Office Action from U.S. Appl. No. 12/464,504.

Non-Final Office Action in U.S. Appl. No. 12/464,504 mailed on Jul. 16, 2012.

Response to Non-Final Office Action dated Jul. 16, 2012 in U.S. Appl. No. 12/464,504 filed on Oct. 16, 2012.

Notice of Allowance in U.S. Appl. No. 12/454,504 mailed on Nov. 20, 2012.

Request for Continued Examination in U.S. Appl. No. 12/454,504, filed Feb. 19, 2013.

* cited by examiner

SYSTEMS AND METHODS FOR DELEGATION AND NOTIFICATION OF ADMINISTRATION OF INTERNET ACCESS

CROSS REFERENCE TO RELATED PATENT APPLICATION

This application claims priority to U.S. Provisional Application No. 60/616,490 filed Oct. 6, 2004 and U.S. Provisional Application No. 60/646,234 filed Jan. 24, 2005, both of which are herein incorporated by reference in their entireties.

BACKGROUND OF THE INVENTION

For many years, Internet Access Control applications have existed to allow users to control the type of content that can be accessed through their Internet connection. Additionally, the ability to log all Internet usage of a user or access policy violations has is known. However, in order to view these logs, or be made aware of access policy violations, a user or a third party has to periodically check the logs. This does not permit instant notification of an Internet Access Policy violation. Administration of Internet access control applications is also problematic. Typically, someone with administrative rights controls the settings of an Internet access control application. This can cause an issue if a user of an Internet access control application does not want access to the administration features of the application.

SUMMARY OF THE INVENTION

Disclosed herein are systems, methods, and computer readable media capable of delegating administrative rights to a third party in an Internet access control application comprising receiving a designation of a third party wherein the designation identifies the third party as a recipient of administrative rights in an access control application, and receiving a selection of administrative rights to be associated with the third party. Further, an invitation can be sent, or caused to be sent, to the third party. Acceptance of said invitation can be received. Also, administrative rights can be granted to the third party. The systems, methods, and computer readable media can be operable within a client/server architecture.

Also disclosed are systems, methods, and computer readable media capable of notification of an Internet access policy violation comprising determining if a threshold has been exceeded, determining a notification to send, determining a recipient of the notification, and causing the notification to be sent to the recipient. The notification can also be sent directly by the system. The systems, methods, and computer readable media can be operable within a client/server architecture.

Further disclosed are systems, methods, and computer readable media capable of administering an access control application comprising receiving an administrative command from a third party administrator and modifying administrative settings associated with a user of the access control application based on the administration command. The systems, methods, and computer readable media can be operable within a client/server architecture.

Additional advantages of the invention will be set forth in part in the description which follows. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

DETAILED DESCRIPTION OF THE INVENTION

Figure 1:
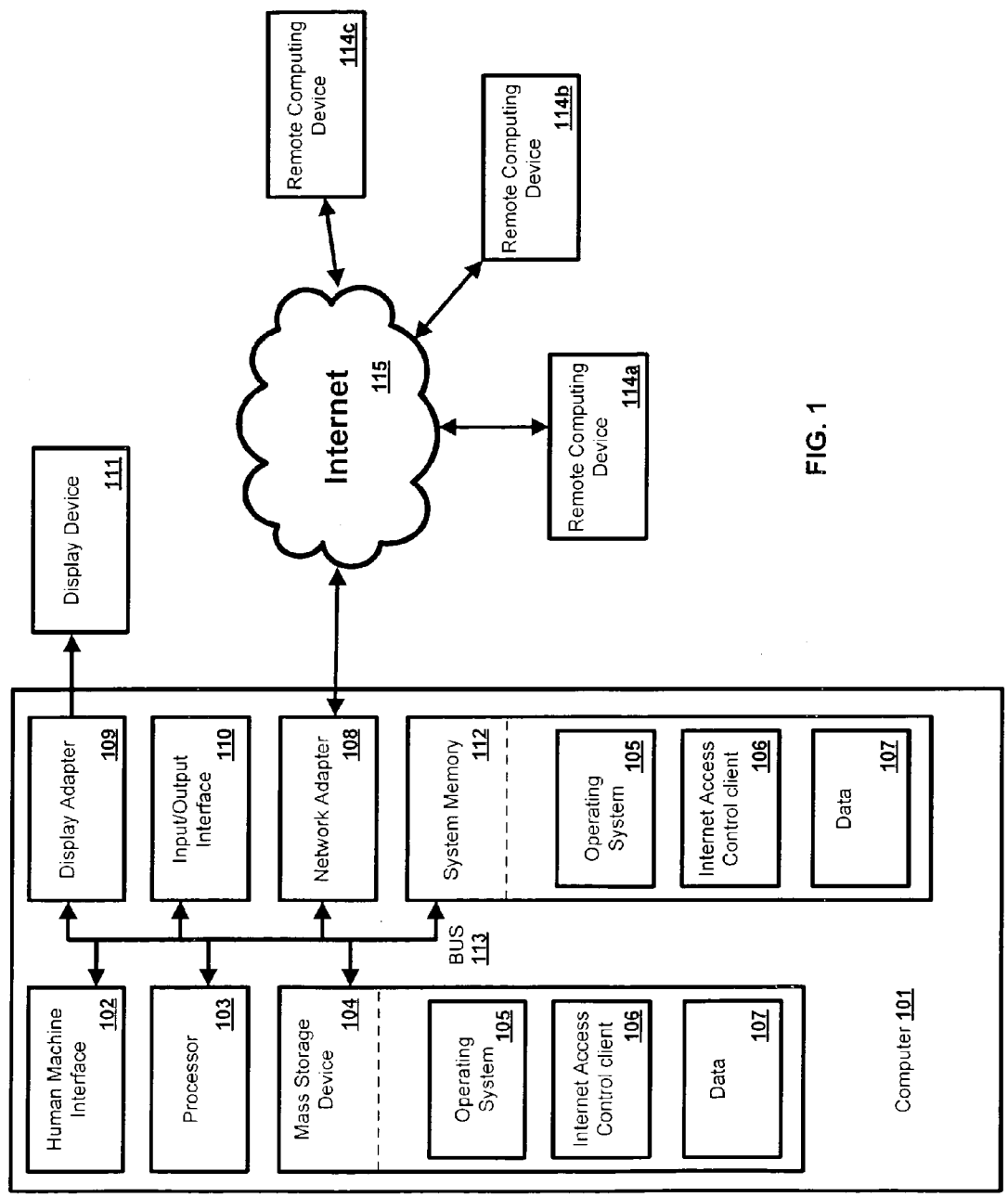
FIG. 1 is a block diagram illustrating an exemplary operating environment for performing the disclosed method.

Before the present methods and systems are disclosed and described, it is to be understood that this invention is not limited to specific synthetic methods, specific components, or to particular compositions, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

A "category" describes the type of content that a website falls into. For example, playboy.com would fall into a "pornography" category. It is possible that a website may fall into more that one category. For example, playboy.com could be categorized as "pornography", "nudity", "sex", "e-commerce" and "adults only".

"Category Mapping" is a list of categories that a website can fall into. In the example of playboy.com the category mapping for this website could include "pornography", "nudity", "sex", "e-commerce" and "adults only".

An "Internet Enabled Application" is any computer application that has the ability to communicate over a network (private or public) through a network-enabling device. An example of this would be Internet Explorer, AOL Instant Messenger, QuickBooks, Microsoft Word, etc.

An "Internet Access Policy" is a set of rules that a user has established as acceptable use of the Internet. This could be specified by a consumer, employer or even governmental body. This policy deems what is appropriate and inappropriate Internet content to access using an Internet enabled device. This policy may even lay out acceptable behavior in regard to use of the Internet. This policy may even be created and enforced by an individual for their personal Internet usage.

A "notifiable website" is a website that violates the Internet Access Policy and has been deemed by a user as being in a category that they would like to be notified about access attempts. For example, the user may specify they want "pornography" and "sports" categories blocked but only request to be notified about "pornography" access attempts. When the computer's user accesses playboy.com this site is blocked and is deemed notifiable, however when the user visits nascar.com the site is blocked but not deemed as notifiable.

The present invention may be understood more readily by reference to the following detailed description of preferred embodiments of the invention and the Examples included therein and to the Figures and their previous and following description.

This invention relates to providing a user of an Internet Access Control application, also referred to as "access control application," the ability to have a third party control the settings of the Internet Access Control application. The third party administrator can remotely modify an access control application user's administrative settings by sending administrative commands, either remotely or locally. As part of the configuration of the Internet Access Control application the user can specify a third party to delegate administrative control to. The method of specifying the third party can vary. By way of example, and not limitation, such methods include using a third party's email address or a username if the third party is also a user of the Internet Access Control application.

The invention relates to providing notification, or causing a notification to be sent, to a user or an administrative user (third party or otherwise), when administrative changes are made to the Internet Access Control application. Additionally, the invention relates to providing notification, which includes causing notification to be sent, to a user, the user can include an administrative user (third party or otherwise), when a violation, or an attempted violation, of the Internet Access Policy, also referred to as "access policy," occurs. When configuring the Internet Access Control application, the user can establish a threshold at which the user wishes to be notified of a violation. The threshold may be a number of violations in a set period of time, a certain number of a specific type of violation, and the like. Each time the Internet Access Control application notices a violation of the Access Policy it can keep track of the details of that violation. When a particular threshold is met or exceeded for a user, one or more notifications can be dispatched.

FIG. 1 is a block diagram illustrating an exemplary operating environment for performing the disclosed method. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The method can be operational with numerous other general purpose or special purpose computing system environments or configurations. Examples of well known computing systems, environments, and/or configurations that may be suitable for use with the system and method include, but are not limited to, personal computers, server computers, laptop devices, and multiprocessor systems. Additional examples include set top boxes, programmable consumer electronics, network PCs, minicomputers, mainframe computers, distributed computing environments that include any of the above systems or devices, and the like.

The method may be described in the general context of computer instructions, such as program modules, being executed by a computer. Generally, program modules include routines, programs, objects, components, data structures, etc. that performs particular tasks or implement particular abstract data types. The system and method may also be practiced in distributed computing environments where tasks are performed by remote processing devices that are linked through a communications network. In a distributed computing environment, program modules may be located in both local and remote computer storage media including memory storage devices.

The method disclosed herein can be implemented via a general-purpose computing device in the form of a computer 101. The components of the computer 101 can include, but are not limited to, one or more processors or processing units 103, a system memory 112, and a system bus 113 that couples various system components including the processor 103 to the system memory 112.

The system bus 113 represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus. This bus, and all buses specified in this description can also be implemented over a wired or wireless network connection. The bus 113, and all buses specified in this description can also be implemented over a wired or wireless network connection and each of the subsystems, including the processor 103, a mass storage device 104, an operating system 105, Internet Control Application client 106, data 107, a network adapter 108, system memory 112, an Input/Output Interface 110, a display adapter 109, a display device 111, and a human machine interface 102, can be contained within one or more remote computing devices 114a,b,c at physically separate locations, connected through buses of this form, in effect implementing a fully distributed system. The computer 101 typically includes a variety of computer readable media. Such media can be any available media that is accessible by the computer 101 and includes both volatile and non-volatile media, removable and non-removable media. The system memory 112 includes computer readable media in the form of volatile memory, such as random access memory (RAM), and/or non-volatile memory, such as read only memory (ROM). The system memory 112 typically contains data such as data 107 and/or program modules such as operating system 105 and Internet Control Application client 106 that are immediately accessible to and/or are presently operated on by the processing unit 103.

The computer 101 may also include other removable/non-removable, volatile/non-volatile computer storage media. By way of example, FIG. 1 illustrates a mass storage device 104 which can provide non-volatile storage of computer code, computer readable instructions, data structures, program modules, and other data for the computer 101. For example, a mass storage device 104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules can be stored on the mass storage device 104, including by way of example, an operating system 105 and Internet Control Application client 106. Each of the operating system 105 and Internet Control Application client 106 (or some combination thereof) may include elements of the programming and the Internet Control Application client 106. Data 107 can also be stored on the mass storage device 104. Data 107 can be stored in any of one or more databases known in the art. Examples of such databases include, DB2®, Microsoft® Access, Microsoft® SQL Server, Oracle®, mySQL, PostgreSQL, and the like. The databases can be centralized or distributed across multiple systems.

A user can enter commands and information into the computer 101 via an input device (not shown). Examples of such input devices include, but are not limited to, a keyboard, pointing device (e.g., a "mouse"), a microphone, a joystick, a serial port, a scanner, and the like. These and other input devices can be connected to the processing unit 103 via a human machine interface 102 that is coupled to the system bus 113, but may be connected by other interface and bus structures, such as a parallel port, game port, or a universal serial bus (USB).

A display device 111 can also be connected to the system bus 113 via an interface, such as a display adapter 109. For example, a display device can be a monitor or an LCD (Liquid Crystal Display). In addition to the display device 111, other output peripheral devices can include components such as speakers (not shown) and a printer (not shown) which can be connected to the computer 101 via Input/Output Interface 110.

The computer 101 can operate in a networked environment using logical connections to one or more remote computing devices 114a,b,c. By way of example, a remote computing device can be a personal computer, portable computer, a server, a router, a network computer, a peer device or other common network node, and so on. Logical connections between the computer 101 and a remote computing device 114a,b,c can be made via a local area network (LAN) and a general wide area network (WAN). Such network connections can be through a network adapter 108. A network adapter 108 can be implemented in both wired and wireless environments. Such networking environments are commonplace in offices, enterprise-wide computer networks, intranets, and the Internet 115.

Figure 2:
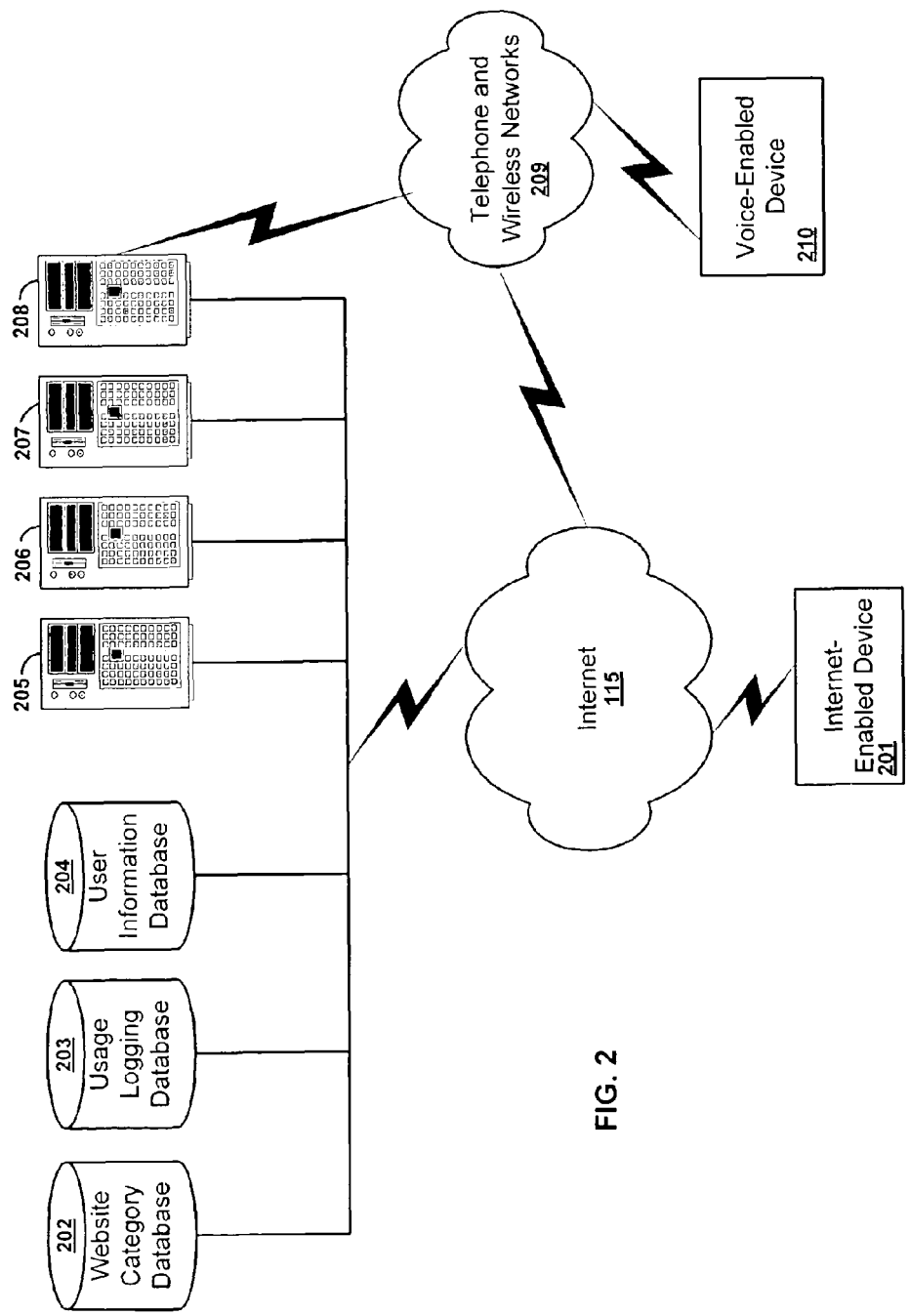
FIG. 2 illustrates in an exemplary networked environment capable of performing the disclosed methods.

FIG. 2 illustrates in more detail an exemplary networked environment capable of performing the disclosed methods. As shown in FIG. 2, an Internet enabled device 201 is connected to the Internet 115. Internet enabled device 201, can be, for example, previously described computer 101, a cellular phone, a PDA, and the like. An Internet Access Control client application can be resident on the Internet enabled device 201 and capable of communicating via the Internet 115 with category server 205, agency server 206, web server 207, and notification server 208. These servers are represented in FIG. 2 as multiple entities for purposes of clarification. However, it is recognized that the tasks associated with each server can be performed by one or more servers. The servers can be, for example, previously described computer 101 and the like. Each server can have one or more databases resident in memory. For example, the category server 205 can store a website category database 202. The agency server 206 can store a usage logging database 203 and a user information database 204. It is recognized that the databases can be stored on any server of the present invention and that any of the servers can connect to any of the databases and that any of the servers can communicate with one another.

Category server 205 can assign a category to a website. The agency server 206 can request the category mapping of a website from the category server 205 upon user request. It can connect to the website category database 202. The website category database 202 can store a category mapping for websites. A website can be categorized into more than one category. The agency server 206 directly communicates with the Internet Access Control client application resident on the Internet enabled device 201. All communication from the Internet Access Control client application can be routed through the agency server 206. The agency server 206 can connect to the usage logging database 203 and the user information database 204. The usage logging database 203 can securely store a user's Internet usage data.

It is not required that a user store this data in the usage logging database 203. The user information database 204 can store data about a user that can be use for managing the users account. This includes, but is not limited too, contact information, billing information, usage history, Internet Access Control client application software settings, and the like. The web server 207 provides the web-based portions of the Internet Access Control client application. This web server 207 can connect to the usage logging database 203 and the user information database 204. The web server 207 can connect to agency server 206 and to the category server 205. The notification server 208 can send notifications to a user or a non-user, or can cause notifications to be sent to a user or a non-user. These notifications can include emails, SMS text messages, instant messages (IM), pages to a pager, voice messages, and the like. The notification server 208 can, for example, issue a phone call to transmit a voice message over the Internet 115 using a Voice Over IP (VoIP) or through a standard telephone connection, these connections are illustrated by the Internet cloud 115 and network cloud 209. The voice message can be received by any voice-enabled device 210. Examples of voice-enabled devices include, VoIP phones, cellular phones, "land line" phones, satellite phones, and the like.

Figure 3:
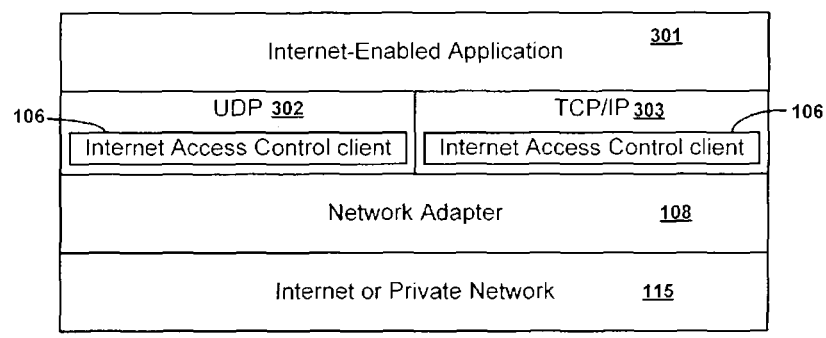
FIG. 3 illustrates where an exemplary Internet Access Control client can reside in a computing device.

For purposes of illustration, application programs and other executable program components such as the operating system 105 are illustrated herein as discrete blocks, although it is recognized that such programs and components reside at various times in different storage components of the computing device 101, and are executed by the data processor(s) of the computer. As illustrated in FIG. 3, portions of the Internet Control Application client 106 can reside inside of the UDP 302 and TCP/IP 303 protocol stacks on the user's computer 101. In doing this the Internet Control Application client 106 can "see" all traffic that comes from a network enabled application 301 that is destined for the Internet 115 or private network via network adapter 108.

An implementation of Internet Control Application client 106 may be stored on or transmitted across some form of computer readable media. Computer readable media can be any available media that can be accessed by a computer. By way of example, and not limitation, computer readable medium may comprise "computer storage media" and "communications media." "Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The processing of the disclosed method can be performed by software components. The disclosed method may be described in the general context of computer-executable instructions, such as program modules, being executed by one or more computers or other devices. Generally, program modules include computer code, routines, programs, objects, components, data structures, etc. that performs particular tasks or implement particular abstract data types. The disclosed method may also be practiced in grid-based and distributed computing environments where tasks are performed by remote processing devices that are linked through a communications network. In a distributed computing environment, program modules may be located in both local and remote computer storage media including memory storage devices.

Figure 4:
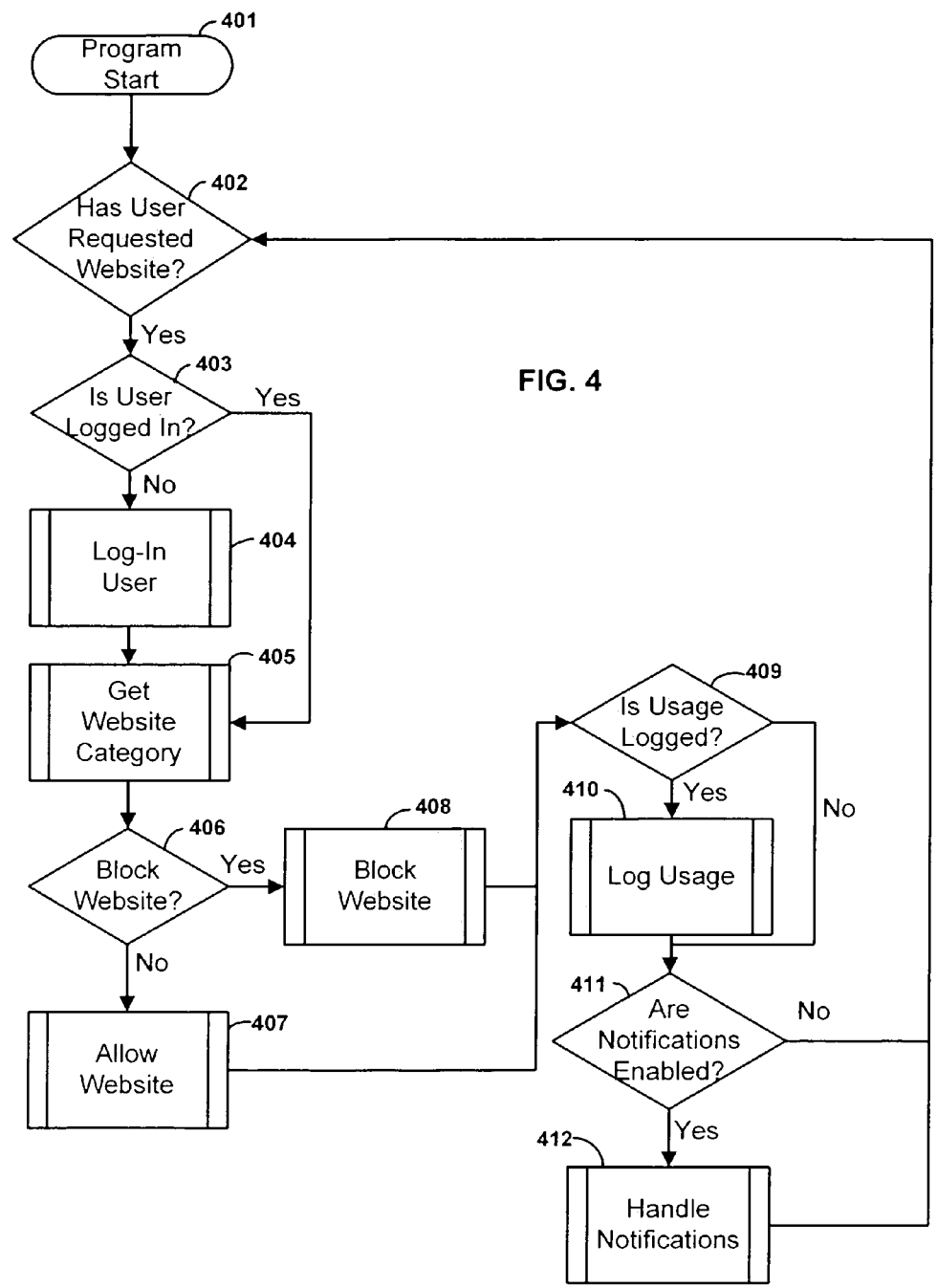
FIG. 4 illustrates operational steps in an exemplary Internet Access Control application.

FIG. 4 illustrates steps in an exemplary Internet Access Control application involving a client and a server. Beginning at block 401, the Internet Access Control client application is started. At 402, a check is performed to determine if the user has requested retrieval of a website via a network enabled application. If no request has been made, the system returns to block 402. Internet Access Control client application will remain in a wait-state until Internet traffic is sensed. Once traffic is sensed Internet Access Control client application will activate and begin processing the traffic. If a request has been made, the system proceeds to block 403 and performs a check to determine if the user is logged in. When Internet traffic is sensed Internet Access Control client application needs to enforce restrictions on the user that is using the computer. As such, the user needs to be determined. If Internet Access Control client application already knows which user is logged in then the system proceeds to block 405 to continue with processing of traffic. If the user is not known, the system proceeds to block 404 to log in the user. The system can prevent all network activity until the user is logged in.

Once the user is logged in, or it is established that the user is already logged in, the system proceeds to block 405. At block 405, the system retrieves the category of the website requested from agency server 206, which in turn requests the category mapping from category server 205. Then at block 406, the system can test the retrieved category against the list of restricted categories associated with the logged-in user. At block 408, if the category is blocked by the user's category restrictions, the website will be blocked. The user can be notified why the website has been restricted. At block 407, if the category is not blocked by the user's category restrictions, the website will be allowed. Once the website is blocked or allowed, the system proceeds to block 409.

At block 409, the system performs a check to determine if usage is logged. Usage logging can include recording websites visited, websites attempted to visit, and the like. If usage logging is enabled, either by the user or by an administrative user (this can be the same or different users), the system proceeds to create and store a log of the website visited or attempted to visit at block 410. The log can be stored locally on the user's computer or the log can be stored in the usage logging database 203 and accessed by the agency server 206 and web server 207. If usage logging is not enabled, or once usage logging is completed, the system proceeds to block 411. At block 411, a check is performed to determine if notifications are enabled. If notifications are not enabled, the system returns to block 402 to wait for the next Internet traffic request. If notifications are enabled the system proceeds to block 412 to handle notifications. A flowchart illustrating exemplary steps in handling notifications can be found in FIG. 5 and described below. Once notifications are handled, the system returns to block 402 to wait for the next Internet traffic request.

Figure 5:
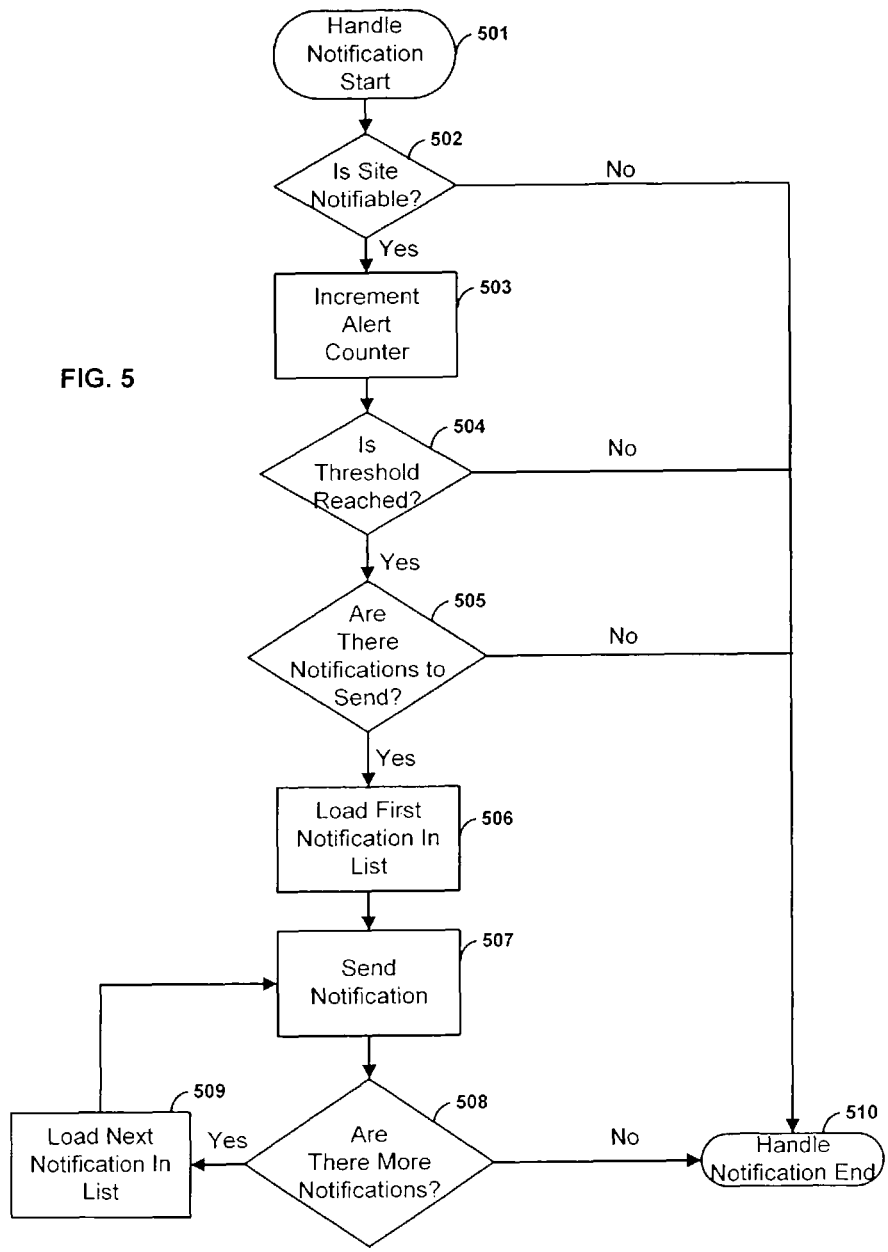
FIG. 5 provides exemplary steps involved in handling notifications.

FIG. 5 provides exemplary steps involved in handling notifications. At block 501, the handle notification starts and proceeds to block 502. At block 502, a check is performed to determine if the current website is notifiable. The user or an administrative user (this can be the same or different users) can set which category, or categories, of websites are notifiable. If the current website is not notifiable, the system proceeds to block 510 and ends notification handling. If the current website is notifiable, the system proceeds to increment an alert counter at block 503. The alert counter tracks the number of sites that are notifiable for a user. Additionally, the timeframe in which the attempted website retrievals have occurred in can be recorded. Other parameters known to those skilled in the art can be used to track notifications.

The system then proceeds to block 504 and performs a check to determine whether a threshold has been reached. The system can review the websites that have been marked as notifiable and determine if a threshold has been tripped that will generate a notification to be sent, or cause the sending of a notification. This determination can be made by a user configurable set of parameters. These parameters can include any combination of the following factors: the number of notifiable sites encountered, the timeframe the attempted website retrievals occur in, the category of the website, and the like. If a threshold has not been reached, the system proceeds to block 510 and ends notification handling. If a threshold has been reached, the system proceeds to bock 505.

Figure 10:
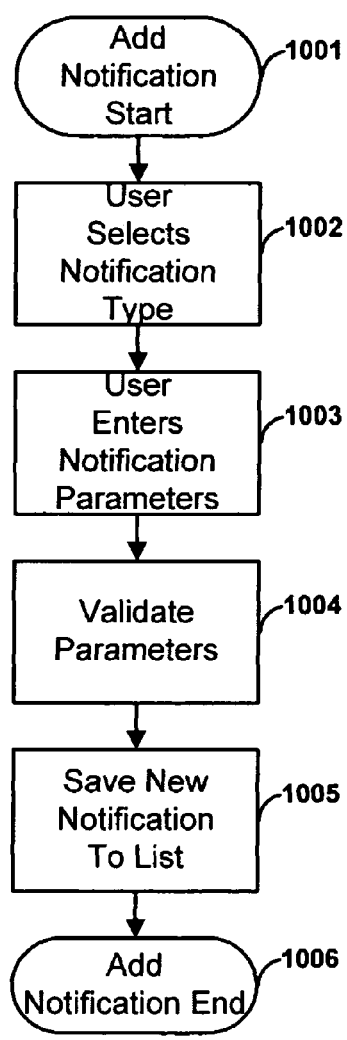
FIG. 10 illustrates exemplary steps involved in adding a notification to an Internet Access Control application.

At block 505, the system determines if there are notifications to send. When a threshold has been reached the system determines if notifications have been setup by a user. The Internet Access control application user can enable notifications and configure a notification list as illustrated in FIG. 10 and described below. If there are no notifications to send or notification is not enabled, the system proceeds to block 510 and ends notification handling. If there are notifications to send, the system proceeds to block 506. At block 506, the system reviews a list of notifications, and loads the first notification in the list. The system then proceeds to block 507 and sends the notification through the notification server 208, or in the alternative, causes the notification to be sent. For example, the system can use an Internet access control client application to send an email directly from a user's computer, or an instant message directly from the user's instant message software. At this step, the notification is formatted and sent according to the type of notification. For example, the notification can be an email, SMS text message, instant message (IM), page to a pager, voice message, and the like. After the notification is sent the system proceeds to block 508 to determine if there are more notifications remaining in the notification list. If there are more notifications in the notification list, the system proceeds to block 509 and loads the next notification from the notification list. The system then returns to block 507 and sends the next notification. If there are no more notifications in the notification list, the system proceeds to block 510 and ends notification handling.

As described herein a user of the Internet Control application can designate a third party to serve as a third party administrative user. A third party administrative user can modify various settings for the user. These settings include, but are not limited to, thresholds, notifications, restricted categories, and the like. The third party administrator can modify the user's Internet Access Control application settings remotely via the Internet, as the user's Internet Access Control client application settings can be stored in User Information Database 204 and made accessible to a server, for example, agency server 206. When the user delegates administrative control to a third party the third party can be sent an invitation via email. This invitation must be accepted before the third party can have administrative control of the user's account. This emailed invitation will instruct the third party on how to create an account, allowing the third party to access the administrative controls of the Internet Access Control Application on behalf of the user. (If the third party has already created an account for use with another user of the Internet Access Control Application, the same account can be used and the new user's administrative controls attached.)

Figure 6:
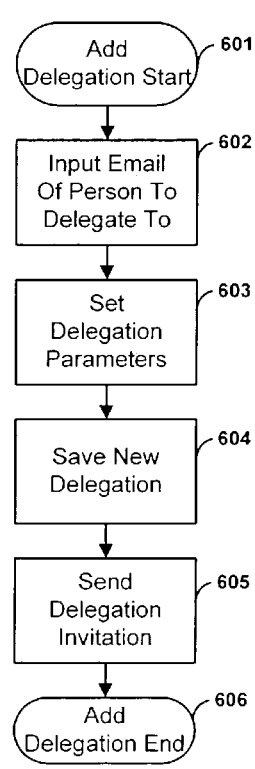
FIG. 6 illustrates exemplary steps involved in delegating administrative control to a third party.

FIG. 6 illustrates exemplary steps involved in delegating administrative control to a third party. At block 601, adding delegation starts and the system proceeds to block 602. At block 602, the user inputs, for example, an email address of the third party that the user would like to delegate administration of their Internet Access Control application settings to. Other means for identifying a third party are specifically contemplated, such as username, unique identifier, telephone number, and the like. Then, at block 603 the user sets delegation parameters for the third party. Such parameters can include, but are not limited to, full access, threshold setting, category setting, notification setting, and the like. Then at block 604 the third party and associated delegation parameters are saved and at block 605 an invitation is sent to the third party by email, for example. Other means for sending an invitation to a third party are specifically contemplated, such as, voice message, SMS text message, instant message (IM), page to a pager, and the like. The system then proceeds to block 606 and terminates adding a third party administrator.

Figure 7:
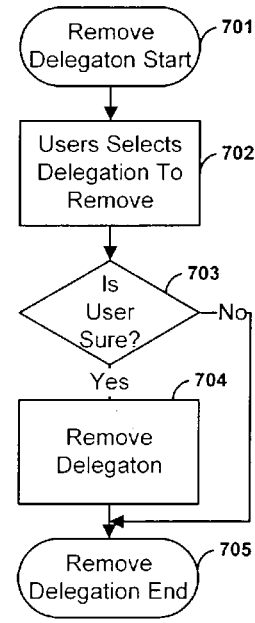
FIG. 7 illustrates exemplary steps involved in removing administrative control from a third party.

FIG. 7 illustrates exemplary steps involved in removing administrative control from a third party. At block 701, removing delegation starts and the system proceeds to block 702. At block 702, the users select the third party administrator to remove delegated rights from. Then, at block 703, the system can confirm the user's selection. If the user does not confirm the selection, the system proceeds to block 705 and terminates third party administrator removal. If the user confirms the selection, the system proceeds to block 704 to remove delegation. Removing delegation can include, but is not limited to, complete removal of all delegated control or removal of selected feature of control, such as threshold setting, category setting, notification setting, and the like. The system then proceeds to block 705 and terminates third party administrator removal.

Once an invitation to be a third party administrator has been accepted, the third party can log in and control the user's account. The third party can have varying degrees of control over the user's account, from limited control to full control. In addition, the third party can have the ability to restrict the user's access to certain administrative settings in the administrative controls. Should the original user attempt to access any area that the third party has restricted, they will be presented with a message informing them that access to the area has been restricted and a notification can be sent to the third party administrative user.

Figure 8:
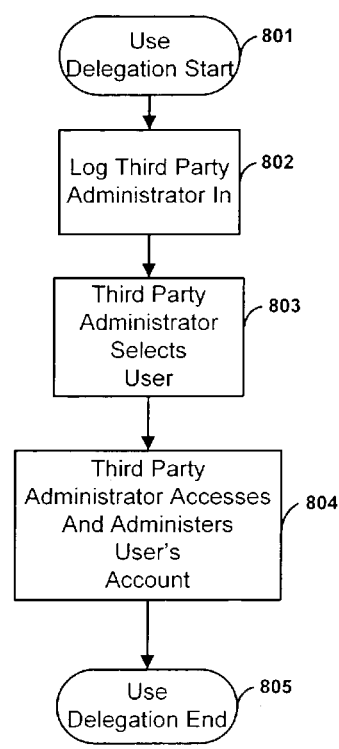
FIG. 8 illustrates exemplary steps involved in a third party administrator's control of a user's account.

FIG. 8 illustrates exemplary steps involved in a third party administrator's control of a user's account. At block 801, using delegation starts and the system proceeds to block 802. At block 802, the third party administrator logs in to verify that they have the authority to control the user's account. If the third party administrator cannot log in then access will not be allowed. Once the third party administrator has successfully logged in, the system proceeds to block 803 where the third party administrator can select the account of the Internet Access Control application user to administer. A third party administrator can have delegated authority from one or more Internet Access Control application users. Once the third party administrator has selected an account to administer, the system proceeds to block 804 where the third party administrator can edit the user's Internet Access Control application settings. The third party administrator can prevent user access to features within the Internet Access Control application administration area that the user previously had access to. The third party administrator can have access to all areas that the Internet Access Control application user has access to as the administrator. This means the third party administrator can change all of the Internet Access Control application settings including passwords and which categories are blocked or allowed. Third party administrators are typically not allowed access to areas containing financial information of the user. The third party administrator can also "lock" users out of certain administrative functions, preventing the user from accessing those functions. When the third party administrator chooses to lock access to certain administrative functions they can limit access to one or more of any administrative feature. When the third party administrator is done editing the user's Internet Access Control application settings, the system proceeds to block 805 and terminates third party administration.

The threshold is how the Internet Access Control application determines that it needs to send notifications. The threshold can be the number of notifiable websites visited in a certain time period or the number of notifiable websites visited without time period. (Visited also encompasses "Attempts" even if the website was blocked.) There could be other factors affecting the threshold like time of day, severity of websites visited or attempted, the currently logged in user, and the like. The admin can also specify the categories that are notifiable since these can differ from the categories that are blocked and allowed. The admin can also specify the times of day that specific notifications can be sent. For instance, a phone notification may be sent during daytime hours but not at night, an email notification may be sent anytime of the day or only when the Internet Access Control application user knows the recipient is at work.

Figure 9:
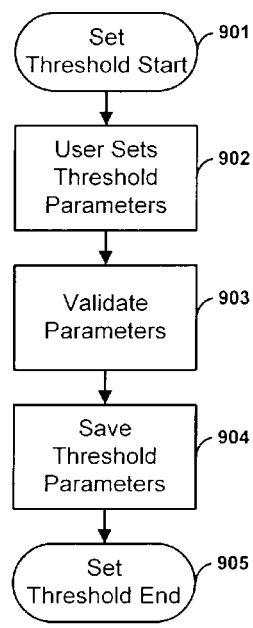
FIG. 9 illustrates exemplary steps involved in setting a threshold.

FIG. 9 illustrates exemplary steps involved in setting a threshold. At block 901, setting threshold starts and the system proceeds to block 902. At block 902, after logging in if not already logged in, the user (can be a third party administrator) sets threshold parameters that will determine when a notification will be sent. Threshold parameters can include, the number of notifiable site viewing attempts and the timeframe in which the notifiable site viewing attempts occurred. Then at block 903, the system validates the parameters to ensure that they are within reasonable bounds. For example the number of notifiable websites cannot be infinite and the timeframe will most likely not be website access attempts in a one year period, etc. Then at block 904, the threshold parameters are saved and the system proceeds to block 905 to terminate threshold setting.

As described earlier, once a threshold has been reached a notification can be sent. Additionally, when an administrative change has been made, or attempted, a notification can be sent. These notifications can be sent to anyone designated by the user, the third party administrator, or both. Notifications can generally be sent to any device capable of receiving a communication signal. These notifications can include, but are not limited to, emails, SMS text messages, instant messages (IM), pages to a pager, voice messages, and the like. Notification can also be made, for example, to a third party application that allows plug-ins. An example can be a custom toolbar for Internet Explorer.

Notification methods and contacts are configured in the Internet Access Control application. Multiple notifications can be applied to each threshold, and thresholds can be set per user. This allows the notification process to be customized for every user of the Internet Access Control application. The notifications can be scheduled such that an administrator may wish to have pager notifications sent out during all hours, but only send phone call notifications from 9:00 am to 5:00 pm. This allows the administrator to further fine tune the notification process.

The notifications can contain information to identify the person who violated the access policy, and can contain additional information about the actual violations or how the violator can best be contacted. Optionally with notification methods implementing 2-Way communication, such as a voice phone call, the administrator can immediately suspend Internet Access for the user who is violating the Access Policy. For example, in the case of a phone call (voice message) notification, the recipient of the notification may be prompted to "Press 1 to disable Internet access now". After pressing 1, they may be asked to enter a password before the Internet Access would be disabled for the violating user. This system allows for immediate notification of Internet Access Policy violations regardless of whether the recipient is at a computer and allows for modification of the user's access rights remotely without requiring the recipient to be at a computer.

FIG. 10 illustrates exemplary steps involved in adding a notification to an Internet Access Control application. At block 1001, adding notification starts and the system proceeds to block 1002. At block 1002, after logging in if not already logged in, the user (can be a third party administrator) can select the type of notification to configure from a list of pre-defined notifications. Then at block 1003, the user can enter notification parameters. Based on the type of notification the user is configuring they can be prompted to enter the parameters required to make the notification work. Each notification type can have its own unique set of parameters that are needed in order to make it function. For example, for voice notification, the user will have to enter a notification recipient phone number. At block 1004, the notification parameters can be validated to ensure they parameters are accurate. For example, the phone number would need to be 10 digits or an email address would need to conform to a user@host.com standard. Then at block 1005, the notification and associated parameters are saved to a notification list. The system then proceeds to terminate adding a notification at block 1006.

Figure 11:
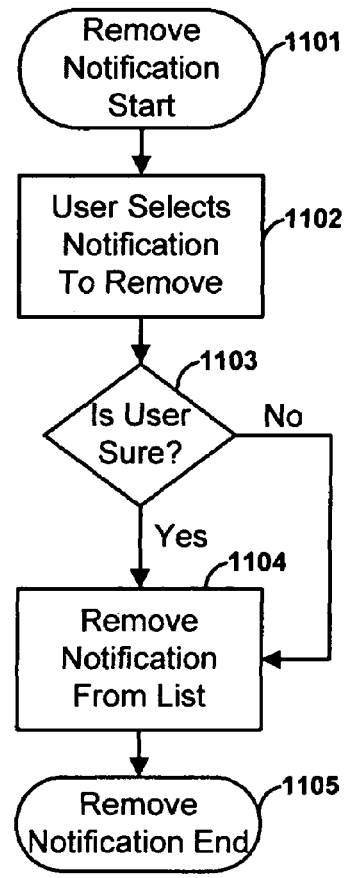
FIG. 11 illustrates exemplary steps involved in removing a notification from an Internet Access Control application.

FIG. 11 illustrates exemplary steps involved in removing a notification from an Internet Access Control application. At block 1101, removing notification starts and the system proceeds to block 1102. At block 1102, after logging in if not already logged in, the user (can be a third party administrator) can select the notification to remove from a list of established notifications. Then the system performs a check at block 1103 to confirm the user's selection. If the user does not confirm the selection, the system proceeds to block 1105 and terminates notification removal. If the user confirms the selection, the notification is removed from the list of established notifications at block 1104. The system then proceeds to block 1105 and terminates notification removal.

While this invention has been described in connection with preferred embodiments and specific examples, it is not intended that the scope of the invention be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer implemented method comprising:

receiving a signal based on a determination that a set of notifiable violations of an Internet access policy detected at an endpoint computing device over a period of time exceeds a threshold number of notifiable violations for the period of time, wherein the set of notifiable violations is included in a plurality of violations detected over the period of time, the plurality of violations also including a set of non-notifiable violations in addition to the set of notifiable violations;

determining a notification to send in response to receiving the signal;

determining a recipient of the notification; and sending the notification to the recipient based at least in part on the determination that the set of notifiable violations exceeds the threshold number, wherein notifiable violations include attempts, by one or more users associated with the endpoint computing device, to access a particular set of websites identified, by a third-party administrator designated by the one or more users, as violating the Internet access policy and eligible to trigger notification of the recipient, and non-notifiable violations by the one or more users do not trigger notification of the recipient.

2. The method of claim 1, further comprising:
receiving a command from the recipient of the notification to terminate Internet access associated with a user account associated with the plurality of violations.

3. The method of claim 2, wherein the notification includes a prompt operable to cause the command to terminate Internet access.

4. The method of claim 1, wherein the notification is caused to be sent via an electronic mail.

5. The method of claim 1, wherein the notification is caused to be sent via an instant message.

6. The method of claim 1, wherein the notification is caused to be sent via a voice message.

7. The method of claim 1, wherein the notification is caused to be sent via a text message.

8. The method of claim 1, wherein the notification identifies the one or more users.

9. The method of claim 1, wherein the one or more users is a plurality of users and the recipient is one of the plurality of users.

10. The method of claim 1, wherein the set of attempts is specified, at least, in part by the one or more users.

11. The method of claim 1, wherein the threshold is defined, at least partially, by the one or more users.

12. A system of notification of an Internet access policy violation comprising:
a server; and
a first access control application resident in the server in communication with a second application resident in a client, wherein the first access control application is configured to:
receive a signal from the second application resident in the client in response to a determination that a set of notifiable violations of an Internet access policy detected over a period of time exceeds a threshold number of notifiable violations for the period of time;
determine a notification type to send in response to receiving the signal;
determine a recipient of the notification; and
send the notification to the recipient based at least in part on the determination that the set of notifiable violations exceeds the threshold number, wherein notifiable violations include attempts, by one or more users associated with the endpoint computing device, to access a particular set of websites identified, by a third-party administrator designated by the one or more users, as violating the Internet access policy and eligible to trigger notification of the recipient, and non-notifiable violations by the one or more users do not trigger notification of the recipient.

13. The system of claim 12, wherein the first access control application is further configured to:
receive a command from the recipient of the notification to terminate Internet access associated with a user account associated with the plurality of violations.

14. The system of claim 12, wherein the first access control application is further configured to:
cause the notification to be sent via an email.

15. The system of claim 12, wherein the first access control application is further configured to:
cause the notification to be sent via an instant message.

16. The system of claim 12, wherein the first access control application is further configured to:
cause the notification to be sent a voice message.

17. The system of claim 12, wherein the first access control application is further configured to:
cause the notification to be sent via a text message.

18. A non-transitory computer readable storage medium having computer executable instructions embodied thereon, wherein said computer executable instructions cause one or more processors to perform operations comprising:
receiving a signal based on a determination that a set of notifiable violations of an internet access policy detected at an endpoint computing device over a period of time exceeds a threshold number of notifiable violations for the period of time, wherein the set of notifiable violations is included in a plurality of violations detected over the period of time, the plurality of violations also including a set of non-notifiable violations in addition to the set of notifiable violations;
determining a notification to send in response to receiving the signal;
determining a recipient of the notification; and
sending the notification to the recipient based at least in part on the determination that the set of notifiable violations exceeds the threshold number, wherein notifiable violations include attempts, by one or more users associated with the endpoint computing device, to access a particular set of websites identified, by a third-party administrator designated by the one or more users, as violating the internet access policy and eligible to trigger notification of the recipient, and non-notifiable violations by the one or more users do not trigger notification of the recipient.

19. The computer readable medium of claim 18, further having computer executable instructions embodied thereon comprising:
receiving a command from the recipient of the notification to terminate Internet access associated with a user account associated with the plurality of violations.

20. The computer readable medium of claim 18, wherein the computer executable instructions embodied thereon cause the notification to be sent via an electronic mail.

21. The computer readable medium of claim 18, wherein the computer executable instructions embodied thereon cause the notification to be sent via an instant message.

22. The computer readable medium of claim 18, wherein the computer executable instructions embodied thereon cause the notification to be sent via a voice message.

23. The computer readable medium of claim 18, wherein the computer executable instructions embodied thereon cause the notification to be sent via a text message.

* * * * *